Dec. 9, 1947.  A. RAINES ET AL  2,432,124
LEVEL VIAL CONSTRUCTION
Filed March 13, 1945

INVENTORS
ARNOLD RAINES.
MILTON SCHOENFELD.
BY C.E. Herrstrom + W.E. Thibodeau
ATTORNEYS.

Patented Dec. 9, 1947

2,432,124

UNITED STATES PATENT OFFICE 2,432,124

LEVEL VIAL CONSTRUCTION

Arnold Raines and Milton Schoenfeld, Philadelphia, Pa.

Application March 13, 1945, Serial No. 582,472

2 Claims. (Cl. 33—211)

(Granted under the act of March 3, 1883, as amended April 30, 1928; 370 O. G. 757)

The invention described herein may be manufactured and used by or for the Government for governmental purposes, without the payment to us of any royalty thereon.

Our invention relates to leveling devices and it has special reference to "spirit" and equivalent levels wherein a cell or vial containing liquid utilizes a bubble to show when the cell is horizontal.

Broadly stated, the object of our invention is to enable such leveling devices to operate equally well through wide temperature ranges which include both high and low extremes.

A more specific object is to safeguard circular level vials against bubble disappearance and bursting due to expansion of the vial's liquid at high temperatures typified by 200° F.

Another object is to permit the bubbles of circular level vials to be effectively read or sighted notwithstanding vial liquid contraction at low temperatures typified by —60° F.

A further object is to provide circular level vials which have the above described attributes and which at the same time are simple in construction, mechanically rugged, and relatively inexpensive to manufacture.

An additional object is to provide so improved circular level vials having unaltered external dimensions that permit interchange with prior art levels without requiring replacement of the level holder or the instrument within which the holder is installed.

Figure 1:
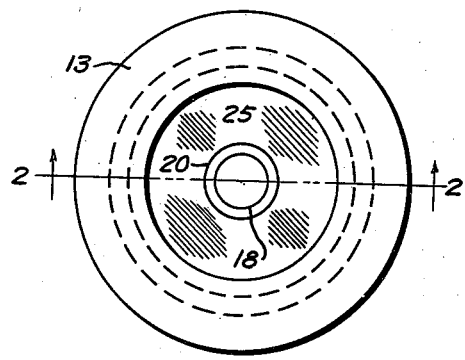
Figure 2:
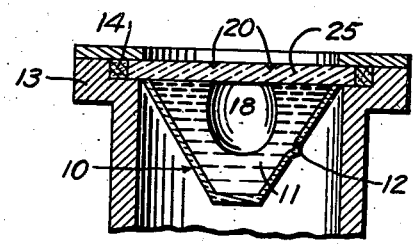

In practicing our invention we attain the foregoing and other objects by providing circular level vials of unique construction and superior performance. Preferred applications of the principles underlying our improved vial construction are shown by the accompanying drawings wherein:

Fig. 1 is a top plan view of a circular level vial improved in accordance with our invention; and Fig. 2 is a section view taken along line 2—2 of Fig. 1.

Measurements made with level vials

Leveling devices of the commonly termed "spirit level" type have long been put to practical use to establish definite relationships to the horizontal.

A device of this type typically comprises a glass (or other transparent material) container or vial shown at 10 in Fig. 2 which is nearly filled with spirits of wine, ether, or similar fluid 11 and hermetically sealed at 12. This transparent container 10 is then fixed in a brass or other metal holder 13, as by the aid of plaster of Paris 14. Part of the holder's uppermost surface is cut away (see Fig. 2) to expose the circular vial which it contains and the reference bubble 18 therein.

Vials of the circular type depicted by the drawings enable an operator to discern when a surface or instrument being tested is horizontal. This is done by virtue of the reference line 20 which has a circular form (see Fig. 1) on the center of the "sighting" or visible surface. Test surfaces or instruments are shown to be horizontal when the bubble 18 comes to equilibrium within the area delimited by circular line 20.

General vial requirements

The performance required of circular level vials varies with the individual application. However, certain general prerequisites are common to all level vial needs.

In size, the bubble 18 must be sufficiently large to be readily visible, and be capable of measurement against reference line 20 as previously described; yet this bubble must not be so large that it will include within its surface area all of the reference marking 20 as previously described; or as sometimes happens, extend beyond the visible glass surface of the vial. Either of these conditions will render level vials useless, as to be readable the bubble 18—18' must be of equivalent or somewhat lesser dimensions than the respective reference marks 15, 20.

The level vial's indicating bubble 18 must also be sufficiently responsive to register the slightest change in horizontal position of an instrument or surface being tested. Yet, the bubble must be neither too mobile nor too sluggish in its movement; for in either case equilibrium of the bubble would be difficult to attain, and use of such levels then would be painstaking and time consuming.

An understanding of the problems involved and overcome by our improvements will be obtained from the following information. Scientific investigation of the factors which determine the size and sensitiveness of the bubble 18 has shown that the bubble's length is chiefly affected by the vial liquid's expansion, and to a lesser extent by the expansion of the glass vial itself. Other contributing properties are the liquid's surface tension and the pressure of the bubble's own gaseous contents.

The above mentioned general vial requirements are to a substantial extent based on effects caused by temperature changes, especially where such variations are in the extremely high and low ranges. To compensate for such temperature variations, it has heretofore been necessary to alter the vial size or to substitute special vial liquids.

Shortcomings of prior art designs

Designers of prior art level vials seem not to have applied the basic principles of liquid expansion which determine the temperature range over which a level vial can properly function. As a result, such vials have generally been found unsatisfactory for use in extremely hot or cold regions.

This shortcoming of prior art level vials assumes added significance by reason of world-wide military requirements of the present day. In torrid regions, for example, it has not been uncommon for users of gunner's quadrants, fire control directors, and other precision instruments to have their equipment become incapacitated due to high temperature expansion of the level vial liquid. Such expansion may cause the liquid completely to fill the cell 10 and thereby eliminate the indicating bubble 18. Sometimes such expansion even bursts the cell 10.

In frigid or other low temperature regions, moreover, corresponding difficulties are encountered. Excessive contraction of the vial liquid 11 enlarges the bubble 18, extending it first beyond the circular reference mark 20 and in some instances even beyond the visible glass surface of vial 10, to the surface area which holder 13 shields from view (see Fig. 2).

Since the accuracy of the vial-carrying instrument frequently is dependent upon a predetermined relationship to the horizontal, level vial impairment from either cause becomes a serious matter.

Vial design based on temperature effect

Investigations made by us show that the foregoing difficulties can be overcome by modifying level vial designs of the prior art in accordance with the following considerations:

Let
V = volume of vial
$L_t$ = volume of liquid at temperature $t$
$B_t$ = volume of bubble at temperature $t$
$L_0$, $B_0$ = volume of liquid and bubble, respectively, at the reference temperature $t_0$ (75° F.)
$b$ = mean coefficient of expansion of the liquid Then, neglecting the expansion of the glass (less than 1% of that of the liquid), bubble volume at any temperature $t$ is given approximately by:

$$B_t = V - L_t = V - L_0[1 b(t-t_0)] \qquad (1)$$

Equating this to zero gives as the condition for bubble disappearance:

$$t - t_0 = \Delta t = \frac{1}{b}\left(\frac{V}{L_0} - 1\right) = \frac{B_0}{bL_0} \qquad (2)$$

The temperature range $\Delta t$ through which the bubble will remain visible is inversely proportional to $b$; and for a given liquid it is proportional to the original ratio of bubble to liquid volume. For a desired upper limit of 200° F., taking 75° F. as the reference temperature, Equation 2 becomes:

$$\frac{B_0}{L_0} = b(200-75) = 125b \qquad (3)$$

The mean value of $b$ for a 60-40 mixture of ether and ethyl alcohol (a widely used and generally accepted vial liquid) for the range 75° F.– 200° F. is calculated to be $96 \times 10^{-5}$ per °F. Thus, $$\frac{B_0}{L_0} = .12 = \frac{1}{8}$$

and this ratio of volumes will prevent bubble disappearance below 200° F. At the lower end of the temperature range (e. g. −60° F.) it is only necessary to be sure that bubble length does not exceed vial length (less overlap of the holder at the ends of the vial).

Analysis of the foregoing shows that a vial which will operate under extreme temperature conditions must have a form of certain prescribed dimensions. For example, a relatively slender construction is a requisite for the cylindrical or tubular form of vial (not here shown). That is to say, a cylindrical or tubular type cell (not shown) should be relatively long compared to its diameter. For a given volume of liquid, therefore, the greater the length of the tubular cell, the more upper or visible vial surface becomes available for bubble expansion.

One important limitation upon increasing the length—and consequently, in the case of the well-known cylindrical vial above discussed, decreasing the diameter—is that the pendant bubble shall not touch the lower surface of the vial. Such contact, of course, adversely affects the mobility of the bubble.

The same general principles illustratively explained above with reference to level vials having well-known cylindrical or tubular construction also applies to circular level vials. This will be made clear as the description hereof proceeds.

Application of design principles

We have discovered that satisfactory "all temperature-range" level vials may be empirically constructed by proper application of the above principles. These principles have been successfully applied by us to meet operating range requirements of from −60° F. to 200° F. Such illustrative application will now be described.

Selection of the vial liquid constitutes the first design step. No problem would exist if there were available a satisfactorily mobile liquid which has a sufficiently low coefficient of expansion. In general, however, those liquids which have low coefficients of expansion are more viscous, and consequently a liquid representing a "compromise" of these two factors must be chosen. One such material commercially available is the 60–40 ether-ethyl alcohol mixture earlier mentioned; another takes the form of mineral spirits made from petroleum and also found to be highly satisfactory for level vial use. In this discussion the ether-ethyl alcohol mixture will be illustratively referred to.

Having selected this "compromise liquid," it is next necessary to determine the bubble-to-liquid relationship needed for proper vial operation at 200° F. Requirement here to be met is that the bubble shall not disappear. Such determination is obtained in accordance with the mathematical considerations earlier stated. These illustratively set the required ratio at 1 part bubble to 8 parts liquid at a reference temperature of 75° F.

In the case of cylindrical or tubular vials, the relative length and diameter dimensions of the vial tube (not here shown) are then selected. Such selection is based on a "trial and error" technique wherein a set volume of the liquid plus bubble of the stated 8 to 1 ratio is arbitrarily chosen. Vial tubes having this chosen total volume, but differing as to relative length and diameter, then have the liquid successively introduced therein for test observations at the lower temperature limit of −60° F.

At this extreme low temperature, the liquid 11 will be contracted while the bubble will be "expanded" in length and depth. In order to assure that the bubble length will not exceed the vial length under these conditions a relatively slender vial construction is essential. Such a construction provides maximum vial surface for bubble expansion with a given volume of liquid.

The limiting factor in the selection of the most slender vial construction possible will be a depth of this bubble which "clears" and hence does not contact the vial's lower surface. This limitation is not critical, however, since the increase in bubble depth is always small compared to the simultaneous increase in the bubble's length.

From the foregoing it will be seen that it is possible to construct level vials which will meet practically any extreme encountered in the entire range of atmospheric temperatures. However, long and relatively slender cylindrical level vials are, generally speaking, an innovation to the art which heretofore has utilized short tubes of relatively broad cross sections. As a result, the general present-day instrument design precludes the interchanging of properly proportioned longer tubes for the old types in the instruments' present brass or cast metal vial holders.

Lack of such interchangeability presents a specific problem when instruments are to be used under extremely wide temperature ranges. The level vials in their old form will not operate for reasons previously explained. Yet, to substitute properly dimensioned vials requires rebuilding and replacement of numerous portions of the instrument of which the vial holder is an integral part, an obviously expensive and time consuming expedient. To meet this unique and specific need, in the case of cylindrical vials (not shown), there has been developed a vial construction which employs an internal component or "insert" whose purpose is to occupy space, reduce the liquid volume, and thereby effect a bubble-liquid ratio which more closely approximates the "ideal" values earlier shown herein to be necessary.

*Circular vial constructions of our invention*

With circular vials there exists a problem which is analogous to that involved with the cylindrical vials just discussed. The same principles which served to solve the cylindrical vial's difficulties may also be applied to circular vials. The manner of improvement is, however, of a somewhat different nature because the shape of bubble 18 in the circular vial is unlike that of the cylindrical type.

A circular vial's bubble 18 appears round to the viewer's eye, rather than long and narrow. Usually, such a bubble has a depth greater than its transverse diameter. At any rate, this diametrical length is not as critical as the bubble length in cylindrical vials, for at low temperatures, the cap 25 or upper surface of the circular vial has a transparent area much larger than the bubble 18 therebeneath. At these low temperatures, however, the bubble also increases in depth until it touches the vial's bottom, and then is less mobile and less capable of uniform motion.

These defects of circular vials could easily be remedied by increasing the depth of the old type cup-shape vial. But this would necessitate an increase in liquid volume as well, thereby reducing the bubble-liquid ratio and consequently lowering the maximum temperature limit at which the vial is usable.

We have accomplished the desired improvement without alteration of the instrument's vial holder or seat 13 (see Fig. 2) in which the vial is positioned. This improvement consists in giving to cell 10 the special "conical" shape shown in Figs. 1 and 2. Such shaping of the vial permits a diminishment of the liquid volume from the old cup-shape cell previously used in circular vials, while simultaneously supplying the desired increase in depth.

Using the proper bubble-liquid ratio designed to operate at a selected maximum temperature, the vial can then be made so as to also operate satisfactorily at very cold ranges in a manner similar to the technique described for cylindrical vials.

*Summary*

From the foregoing description and drawings it will become evident that we have enabled level vials of the "spirit" and equivalent types to operate equally well through wide temperature ranges which include both high and low extremes; that we have safeguarded such level vials against bubble disappearance and bursting at 200° F.; that we have permitted the bubbles of such vials to be effectively read at −60° F.; that we have provided circular level vials having the above attributes and yet being simple in construction, mechanically rugged and relatively inexpensive to manufacture; and that we have provided so-improved level vials having unaltered external dimensions that permit interchange with prior art level vials without requiring replacement of the level holder or the instrument within which the holder is installed.

Our inventive improvements thus are extensive in their adaption and hence are not to be restricted to the specific forms here disclosed by way of illustration.

We claim:

1. In a circular level vial, the combination of an essentially cone-shaped receptacle having a transparent top wall that defines the receptacle's maximum diameter and substantially straight side walls that taper inwardly down from said top wall to a vial bottom whose diameter is much smaller than that of the top wall, reference markings on said transparent top wall and a mobile liquid hermetically sealed into said cone-shaped receptacle and having formed in the upper surface thereof an air bubble which is registerable with said reference markings, said tapered side wall shaping of the receptacle being so coordinated with said liquid's volume and expansion coefficient that at extremely high temperatures the liquid's expansion cannot cause said bubble to disappear while at extremely low temperatures the liquid's contraction cannot enlarge the bubble sufficiently to impair freedom of movement or to make contact with the vial's bottom.

2. In a circular level vial, the combination of an essentially cone-shaped receptacle having a transparent top wall that defines the receptacle's maximum diameter and substantially straight side walls that taper inwardly down from said top wall to a vial bottom whose diameter is much smaller than that of the top wall, reference markings on said transparent top wall, and a mobile liquid hermetically sealed into said cone-shaped receptacle and having formed in the upper surface thereof an air bubble which is registerable with said reference markings, said tapered side wall shaping of the receptacle being so coordinated with said liquid's volume and expansion coefficient that at high temperatures typified by 200° F. the liquid's expansion cannot cause said bubble to disappear while at low temperatures typified by −60° F. the liquid's contraction cannot enlarge the bubble sufficiently to impair freedom of movement or to make contact with the receptacle's bottom.

ARNOLD RAINES.
MILTON SCHOENFELD.

REFERENCES CITED

The following references are of record in the file of this patent:

UNITED STATES PATENTS

| Number | Name | Date |
| --- | --- | --- |
| 674,107 | Trant | May 14, 1901 |
| 988,637 | Graul | Apr. 4, 1911 |

FOREIGN PATENTS

| Number | Country | Date |
| --- | --- | --- |
| 207,871 | Great Britain | 1923 |